(12) United States Patent
Park

(10) Patent No.: US 11,759,815 B2
(45) Date of Patent: Sep. 19, 2023

(54) SHOWER HEAD WITH ONE-TOUCH DETACHABLE STRUCTURE

(71) Applicant: Haksu Park, Incheon (KR)

(72) Inventor: Haksu Park, Incheon (KR)

(73) Assignee: Haksu Park, Incheon (KR)

( * ) Notice: Subject to any disclaimer, the term of this patent is extended or adjusted under 35 U.S.C. 154(b) by 120 days.

(21) Appl. No.: 17/517,077

(22) Filed: Nov. 2, 2021

(65) Prior Publication Data
US 2022/0234068 A1      Jul. 28, 2022

(30) Foreign Application Priority Data
Jan. 22, 2021   (KR) ......................... 10-2021-0009061

(51) Int. Cl.
*B05B 15/65*       (2018.01)
*B05B 1/18*        (2006.01)

(52) U.S. Cl.
CPC ................ *B05B 15/65* (2018.02); *B05B 1/18* (2013.01)

(58) Field of Classification Search
CPC ............ B05B 15/65; B05B 15/40; B05B 1/18
USPC .................................................. 239/553, 600
See application file for complete search history.

(56) References Cited

FOREIGN PATENT DOCUMENTS

KR    10-2016-0087498 A    7/2016

*Primary Examiner* — Christopher S Kim
(74) *Attorney, Agent, or Firm* — NKL LAW; Jae Youn Kim

(57) ABSTRACT

Provided is a shower head with the one-touch detachable structure, which is installed in a bathroom or on a sink. The shower head allows women or the old and the infirm who have weak wrist power and grasping power to easily connect and disconnect a handle body of the shower head to and from a hose in one-touch since the hose connected to a faucet and the handle body of the shower head in a one-touch detachable manner. Moreover, the shower head allows women or the old and the infirm who have weak wrist power and grasping power to easily connect and disconnect the handle body to and from the head assembly in one-touch since the handle body and the head assembly are connected and disconnected in a one-touch detachable manner.

6 Claims, 13 Drawing Sheets

SHOWER HEAD WITH ONE-TOUCH DETACHABLE STRUCTURE

CROSS-REFERENCE TO RELATED APPLICATION

This application claims priority to and the benefit of Korean Patent Application No. 10-2021-0009061, filed on Jan. 22, 2021, the disclosure of which is incorporated herein by reference in its entirety.

BACKGROUND OF THE INVENTION

Field of the Invention

The present invention relates to a shower head with a one-touch detachable structure, and more particularly, to a shower head which is installed in a bathroom or on a sink and has a handle body which is easily detachable from an end portion of a hose in one-touch by women or the old and the infirm.

Background Art

In general, a shower head which is installed in a bathroom or on a sink is a device which is connected with a valve of a water pipe to spray water flowing through a water supply. A hose connected with a valve is combined with an end of the shower head.

The shower head includes: a handle which allows a user to grasp with the hand and of which the end is combined with a hose; and a head part formed at the upper end of the handle to spray raw water. In this instance, the handle has a hollow part formed therein to guide the raw water flowing through the hose to the head part.

The shower head has a structure to spray mainly tap water as raw water. Recently, functional shower heads having multiple functions are coming out. Korean Patent Publication No. 10-2016-0087498 (literature cited) discloses a functional shower head. The functional shower head includes:

a head part having a hollow part, in which raw water is temporarily stored, and an opening part with an open front surface; a water pressure increase plate having multiple discharge holes, which discharge the raw water flowing into the hollow part by being connected to the open front surface of the head part and are formed at the center or an edge, and a first guide part or a third guide part formed on the rear surface to guide the raw water flowing into the hollow part to the discharge hole; a water spray plate having multiple fine water discharge holes spraying the raw water discharged through the discharge hole of the water pressure increase plate and mounted on the front of the water pressure increase plate to maintain intervals by a spacer unit; a connection part accommodating the water spray plate, the spacer, and the water pressure increase plate therein and assembled to the head part to be detached; and a handle connected to the head part and having a flow path guiding the raw water flowing through a hose to the head unit.

Here, the handle of the shower head disclosed in the literature cited has a male thread formed on the outer peripheral surface of the lower end thereof to connect the hose. So, if the hose is not firmly coupled with the male thread, water may leak through the screw-coupled part. Accordingly, the conventional shower head has a disadvantage in that it is difficult for women or the old and the infirm who have weak wrist power and grasping power to attach or detach the shower head to or from the hose.

Moreover, the conventional shower head has another disadvantage in that a user has to rotate the handle several times when attaching or detaching the shower head to or from the hose since the handle of the shower head and the hose are screw-coupled.

Furthermore, the upper end of the handle of the shower head is screw-coupled to an inlet formed at the lower portion of the head body, and a cylindrical filter member is mounted in a water passage of the handle in order to filter foreign matters of the raw water. Therefore, if the filter member is contaminated, the user has to separate the handle screw-coupled with the head part, and wash the contaminated filter member or replace it with a new one. However, because the conventional shower head has the structure that the head part and the handle are screw-coupled with each other, if the head part is not firmly coupled with the handle, water may leak through the screw-coupled part. Accordingly, there is difficulty in that women or the old and the infirm who have weak wrist power and grasping power attach or detach the head part to or from the handle to wash or replace the filter member.

Moreover, the conventional shower head has another disadvantage in that a user has to rotate the handle several times when attaching or detaching the shower head to or from the hose since the handle of the shower head and the hose are screw-coupled.

Additionally, there is inconvenience in that the user has to rotate the head part or the handle several times when attaching or detaching the head part to or from the handle since the head part and the handle are screw-coupled with each other.

PATENT LITERATURE

Patent Documents

Patent Document 1: Korean Patent Publication No. 10-2016-0087498

SUMMARY OF THE INVENTION

Accordingly, the present invention has been made to solve the above-mentioned problems occurring in the prior arts, and it is an object of the present invention to provide a shower head with a one-touch detachable structure, which is installed in a bathroom or on a sink and has a handle body which is easily detachable from an end portion of a hose with one-touch by women or the old and the infirm.

It is another object of the present invention to provide a shower head with a one-touch detachable structure, which women or the old and the infirm can easily attach or detach a handle body of the shower head and a head assembly to spray water with less power in one-touch.

To accomplish the above object, according to the present invention, there is provided a shower head with a one-touch detachable structure, which includes a handle body which has a flow path formed in a body so that tap water can flow therein and of which the lower end is connected to a hose, and a head assembly which is coupled to the upper end of the handle body and to which a water spray board having fine water discharge holes for spraying tap water introduced through the flow path is coupled, the shower head further including: an inflow connection part disposed at the lower end of the handle body; a first connection means disposed at an end portion of the hose; and a second connection means disposed at the inflow connection part, which is disposed at the lower end of the handle body, in order to be detachably attached to the first connection means, wherein the first connection means includes: a male coupler mounted at the front end of the hose and having an insertion tube protruding from the front end of the male coupler, and the second connection means includes a female coupler mounted at the inflow connection part in order to lock or unlock the insertion tube, wherein the male coupler is formed in a cylindrical shape, has an end connected to the hose and the other end from which the insertion tube fit into the female coupler extends, and has a retaining groove formed on the outer peripheral surface of the insertion tube, wherein the female coupler includes: a first sealing member and a second sealing member each of which one side is fit and seated onto the coupling groove of the inflow connection part disposed at the lower end of the handle body; a holder ring having an elastic piece caught to the retaining groove formed on the outer peripheral surface of the insertion tube of the male coupler; a cap ring which presses the holder ring in the direction of the second sealing member to fix the holder ring to the coupling groove of the inflow connection part; and a push ring which presses the elastic piece of the holder ring caught to the retaining groove formed on the outer peripheral surface of the insertion tube of the male coupler to separate the elastic piece from the retaining groove, wherein the second sealing member has a locking jaw formed on the outer face thereof, and the cap ring has a locking groove formed on the upper portion of the inner wall thereof to support the locking jaw of the second sealing member, and wherein a fitting protrusion part is formed at the upper end of the second sealing member, and a fitting groove is formed at the lower portion of the first sealing member so that the fitting protrusion part of the second sealing member is inserted into the fitting groove.

In this instance, the inflow connection part extends integrally in such a way that the outer diameter gets narrower toward the lower end thereof.

Moreover, a male screw thread is extended at the lower end of the handle body, and a female screw thread is formed at the upper side of the inner peripheral surface of the inflow connection part to be screw-coupled with the male screw thread.

Furthermore, in another aspect of the present invention, there is provided a shower head with a one-touch detachable structure, which includes a handle body which has a flow path formed in a body so that tap water can flow therein and of which the lower end is connected to a hose, and a head assembly which is coupled to the upper end of the handle body and to which a water spray board having fine water discharge holes for spraying tap water introduced through the flow path is coupled, the shower head further including: an inflow connection part disposed at the lower end of the handle body; a first connection means disposed at an end portion of the hose; and a second connection means disposed at the inflow connection part, which is disposed at the lower end of the handle body, in order to be detachably attached to the first connection means, wherein a third connection means is disposed at the upper end of the handle body, and a fourth connection means is disposed at the lower end of the head assembly, so that the third connection means and the fourth connection means are simply attached and detached in one-touch, wherein the third connection means includes: a fixing part extending to the upper end of the handle body and having a third path vertically formed at the center thereof and a plurality of ball seating parts formed on the flank; fixing balls rotatably disposed on the plurality of ball seating parts; and a push member coupled to the outer peripheral surface of the fixing part to support the fixing balls and being vertically movable along the fixing part to make the fixing balls appear and disappear in the direction of the third path, and wherein the fourth connection means is disposed at the lower end of the coupling part of the head assembly, and includes a connection member having a connection part which protrudes downwards to be inserted into the third path of the fixing part and has a fourth path formed in the longitudinal direction, and a ball support groove which is formed on the outer peripheral surface of the connection part to support the fixing balls on the same circumference.

In this instance, a support jaw is formed on the outer peripheral surface of the fixing part, a spring seating groove is formed on the inner surface of the push member, and a return spring is mounted on the spring seating groove to press the push member upwards.

Furthermore, rotation preventing grooves are formed at the upper end of the fixing part of the handle body, and rotation preventing protrusions supported in the rotation preventing grooves are formed on the coupling part of the head assembly.

According to preferred embodiments of the present invention, the shower head with the one-touch detachable structure, which is installed in a bathroom or on a sink, allows women or the old and the infirm who have weak wrist power and grasping power to easily connect and disconnect the handle body of the shower head to and from the hose in one-touch since the hose connected to the faucet and the handle body of the shower head has a one-touch detachable structure, differently from the conventional shower head which demands strong wrist power and grasping power and has a screw-coupling type connection and disconnection structure.

Additionally, the shower head with the one-touch detachable structure according to preferred embodiments of the present invention allows a user to easily connect and disconnect the shower head to and from the hose, and allows women or the old and the infirm who have weak wrist power and grasping power to easily connect and disconnect the handle body to and from the head assembly in one-touch since the handle body and the head assembly are connected and disconnected in the one-touch detachable structure.

In addition, according to preferred embodiments of the present invention, in case of a shower head which has a filter member embedded in a flow path of the handle body, anyone can easily wash or replace the filter member.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
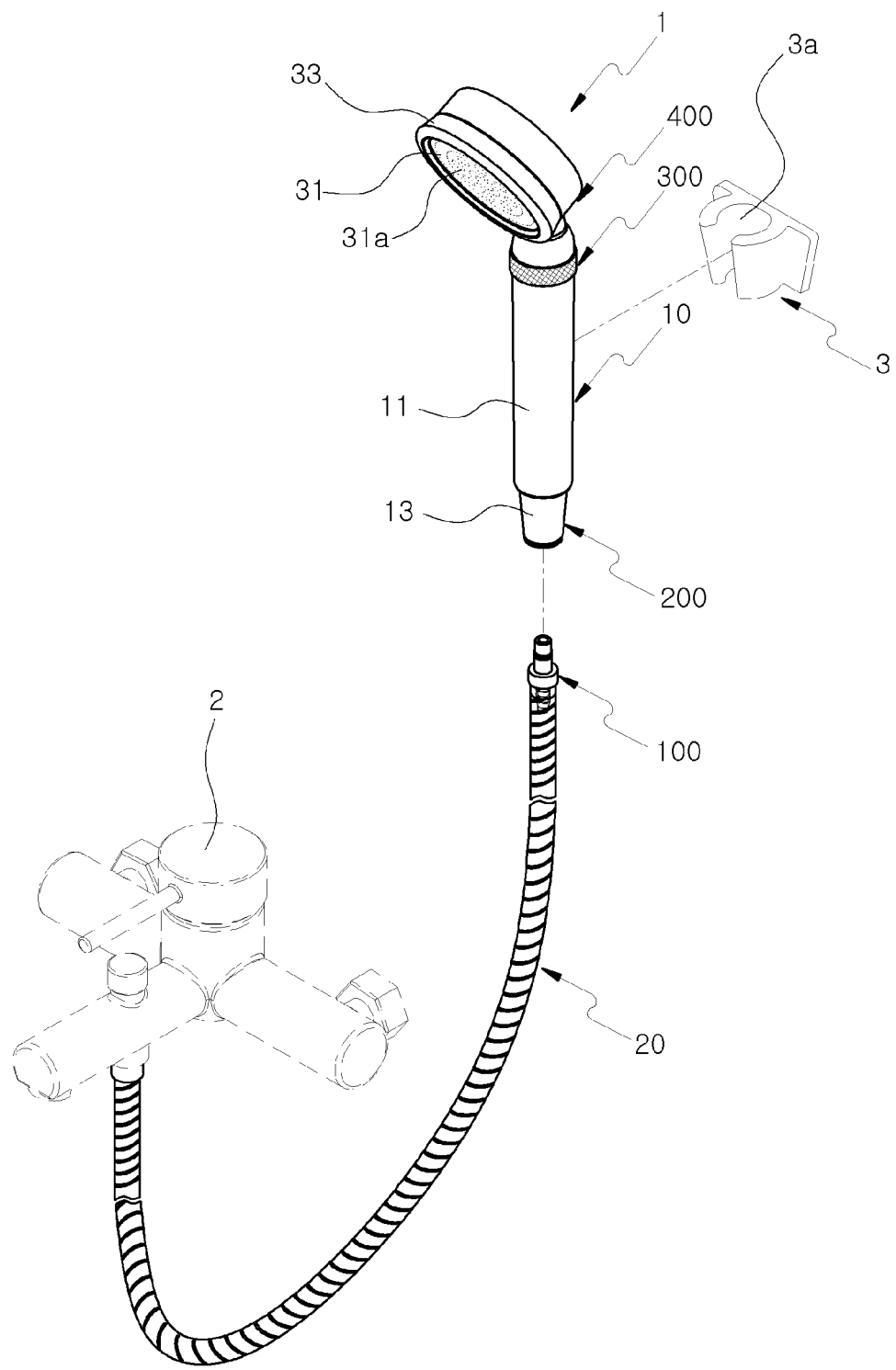
FIG. 1 is a perspective view of a shower head with a one-touch detachable structure according to a first preferred embodiment of the present invention.
Figure 2:
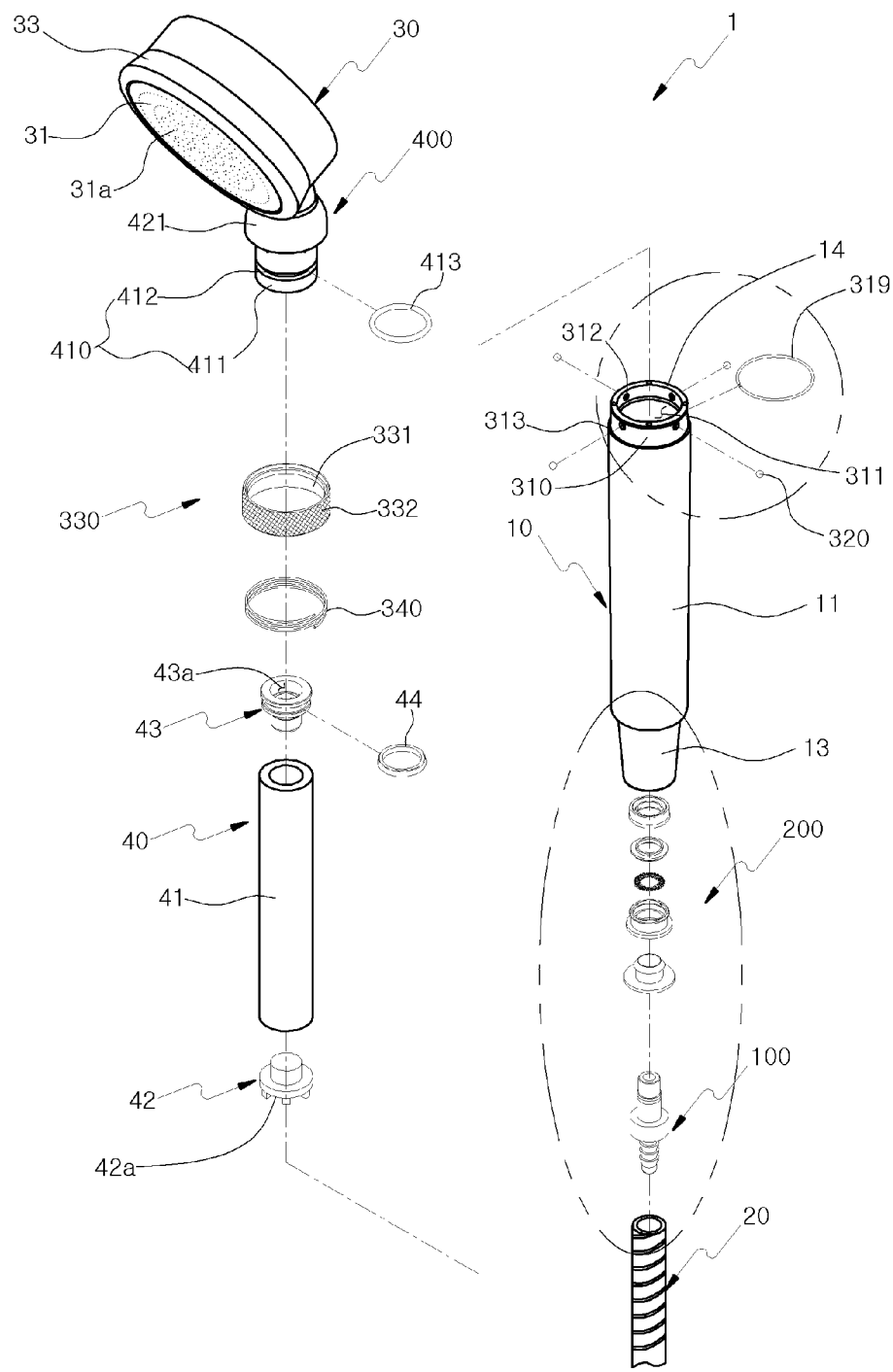
FIG. 2 is an exploded view of the shower head with the one-touch detachable structure according to the first preferred embodiment of the present invention.
Figure 3:
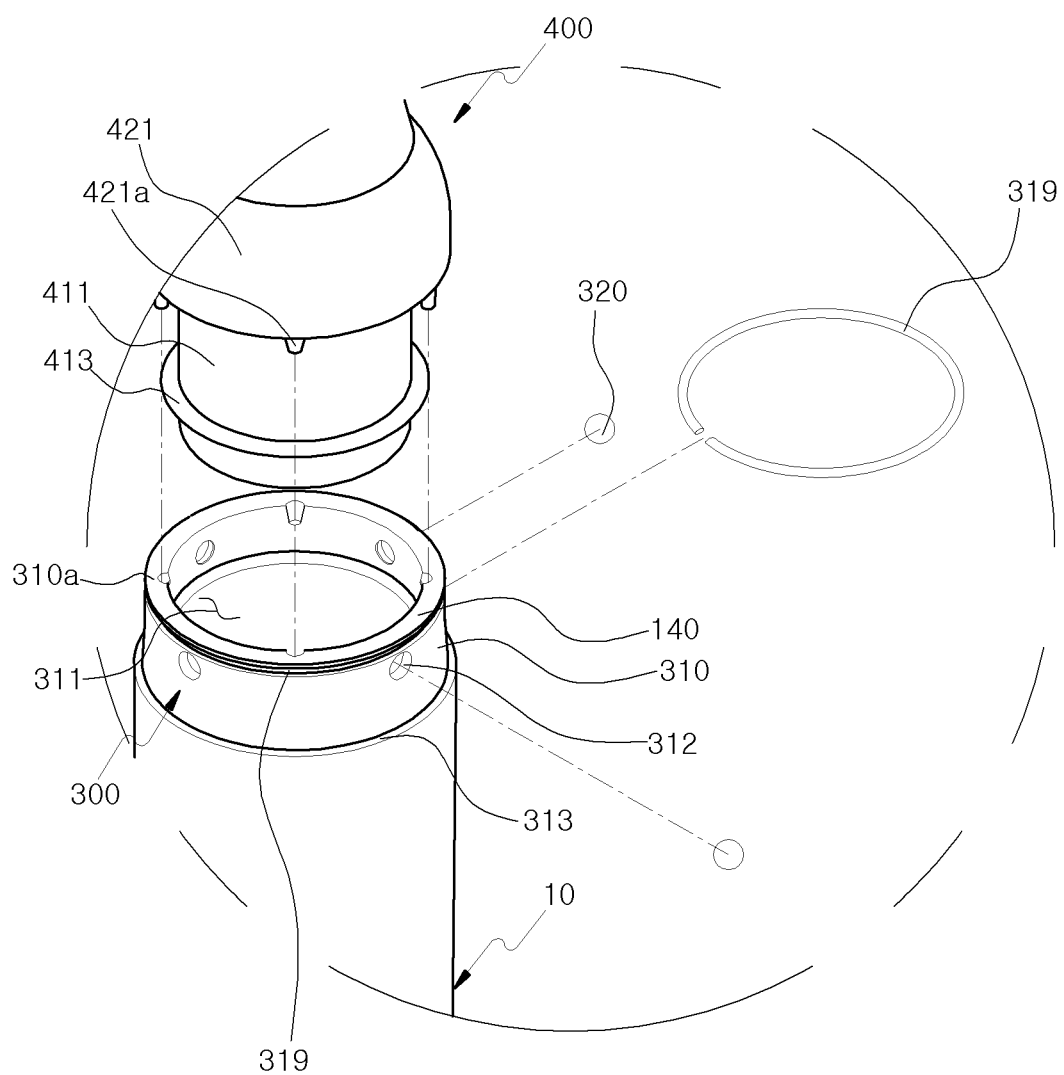
FIG. 3 is a perspective view illustrating a state before coupling of a handle body and a head assembly of the shower head with the one-touch detachable structure according to the first preferred embodiment of the present invention.
Figure 4:
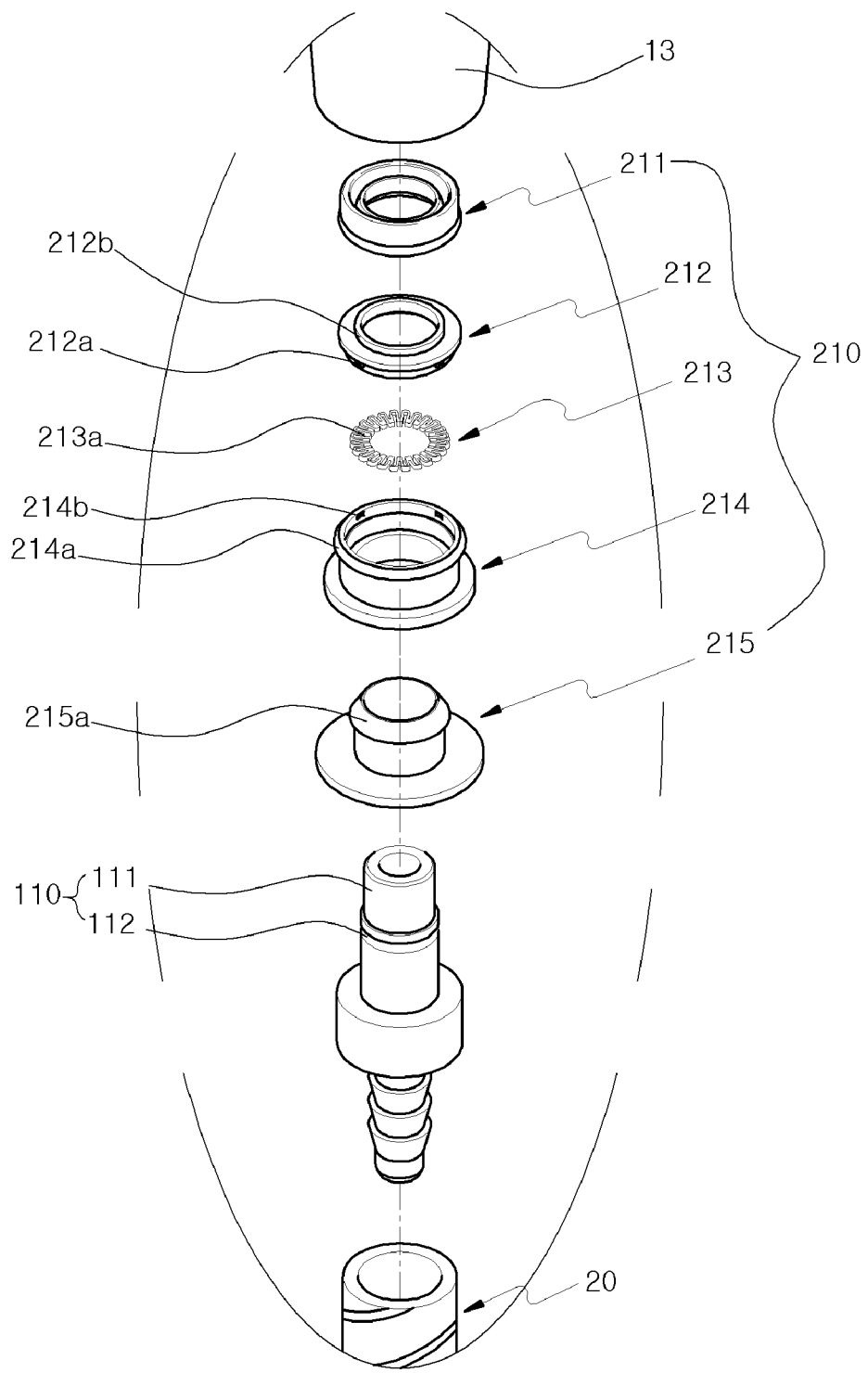
FIG. 4 is an enlarged perspective view illustrating an exploded state of the handle body of the shower head and a hose according to the first preferred embodiment of the present invention.
Figure 5:
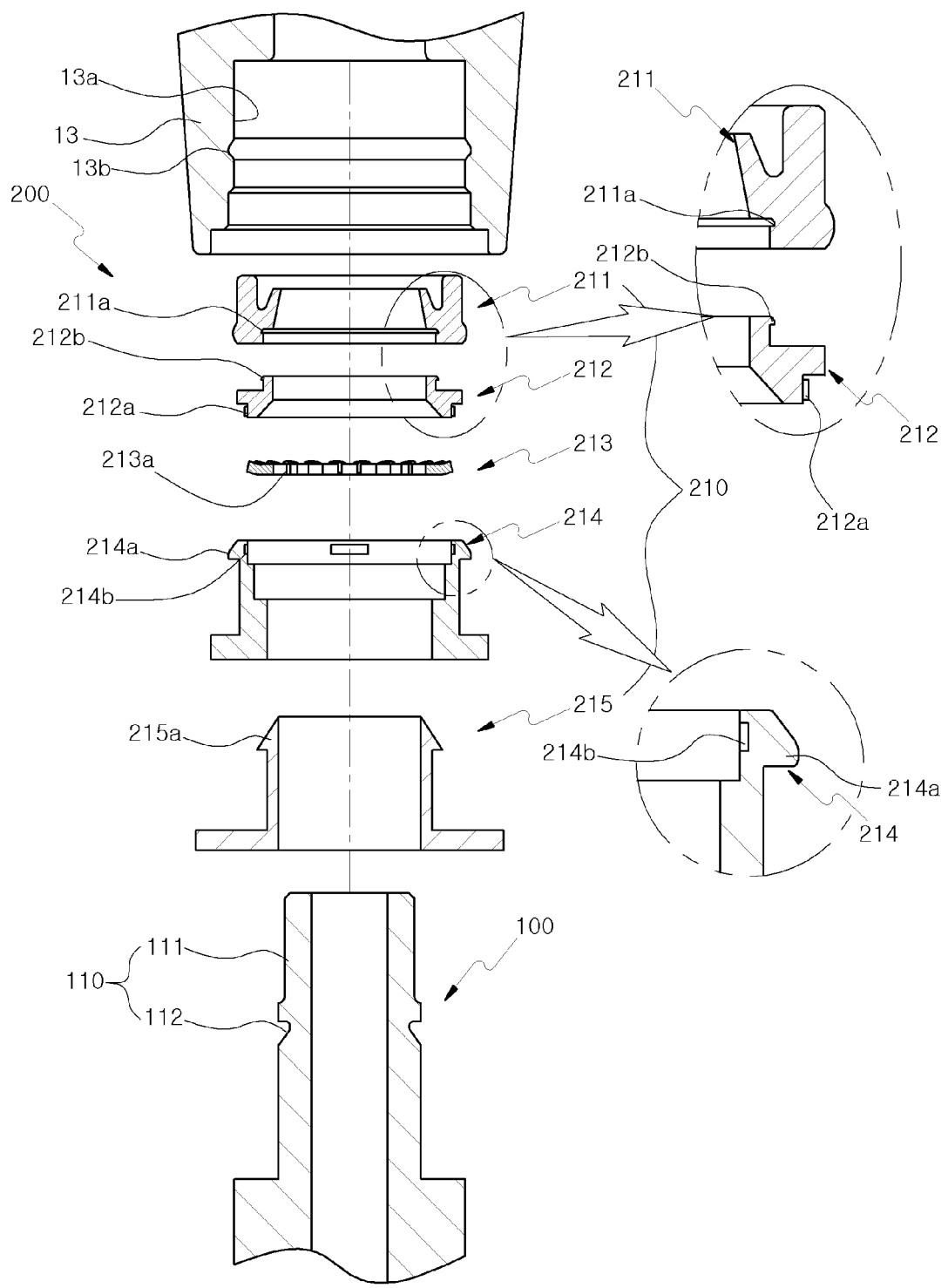
FIG. 5 is an enlarged sectional view illustrating an exploded state of the handle body of the shower head and the hose.
Figure 6:
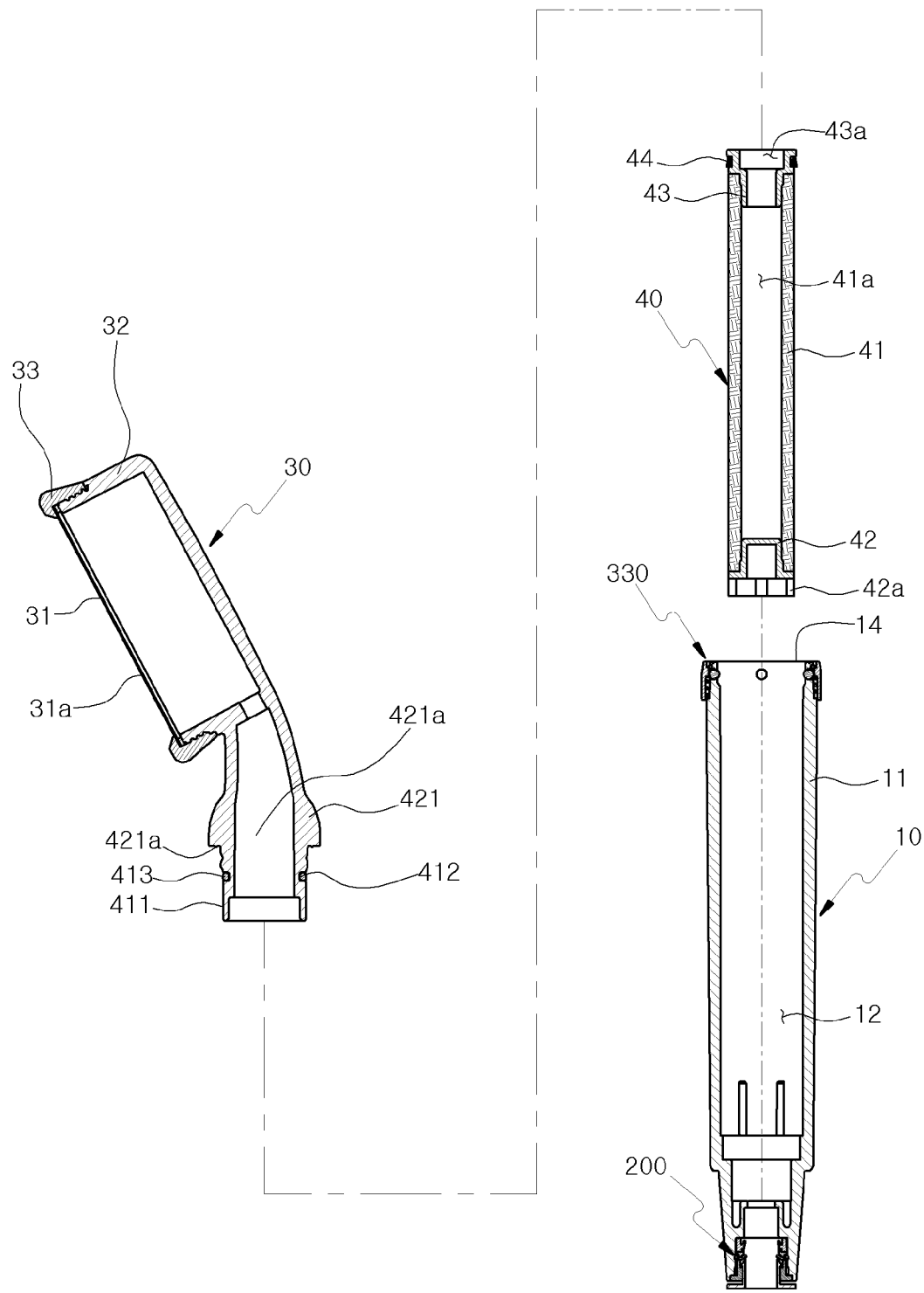
FIG. 6 is an exploded sectional view of the shower head with the one-touch detachable structure according to the first preferred embodiment of the present invention.
Figure 7:
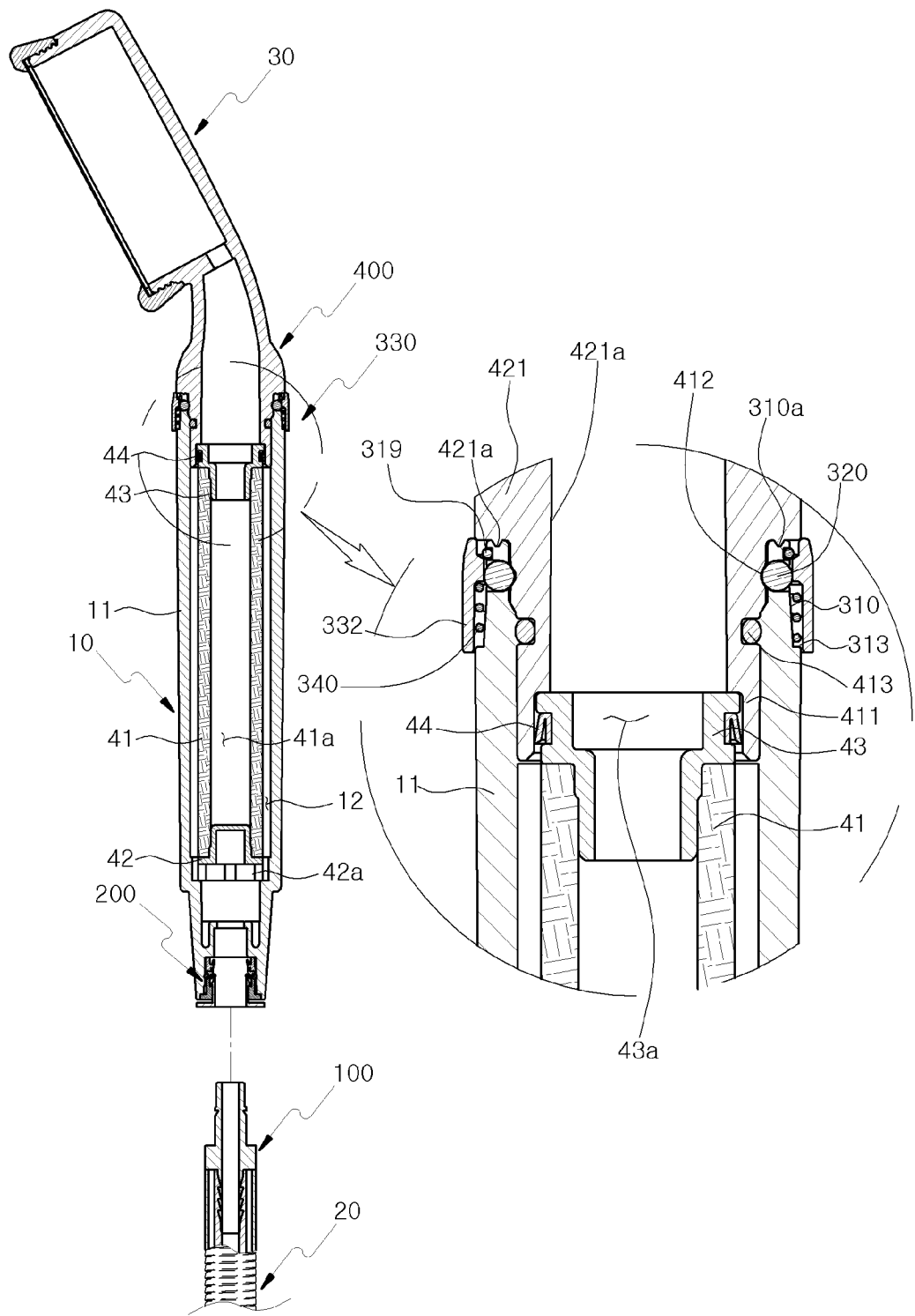
FIG. 7 is a sectional view illustrating a state before coupling of the handle body of the shower head and the hose.
Figure 8:
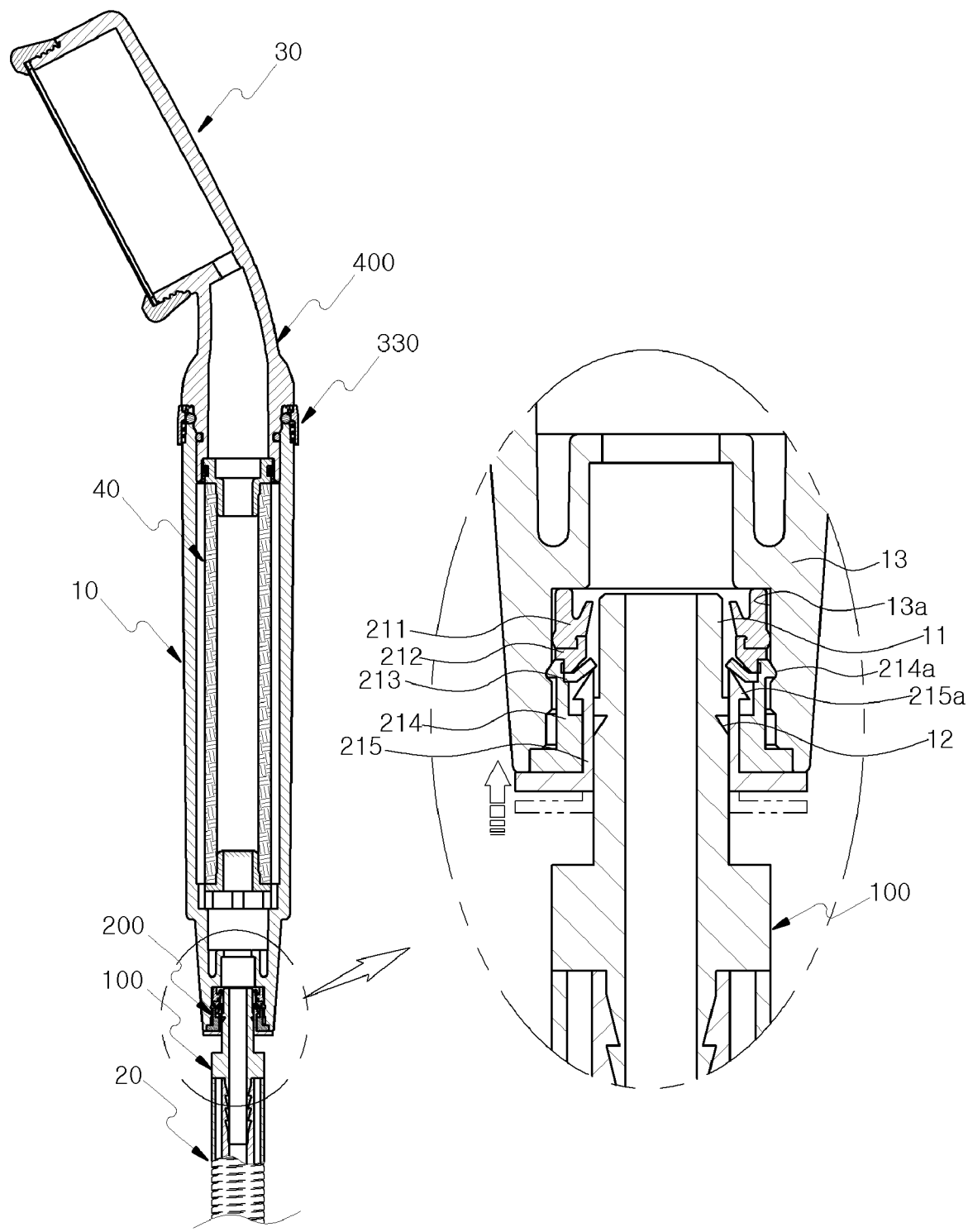
FIG. 8 is a sectional view illustrating a state during coupling of the handle body of the shower head and the hose.
Figure 9:
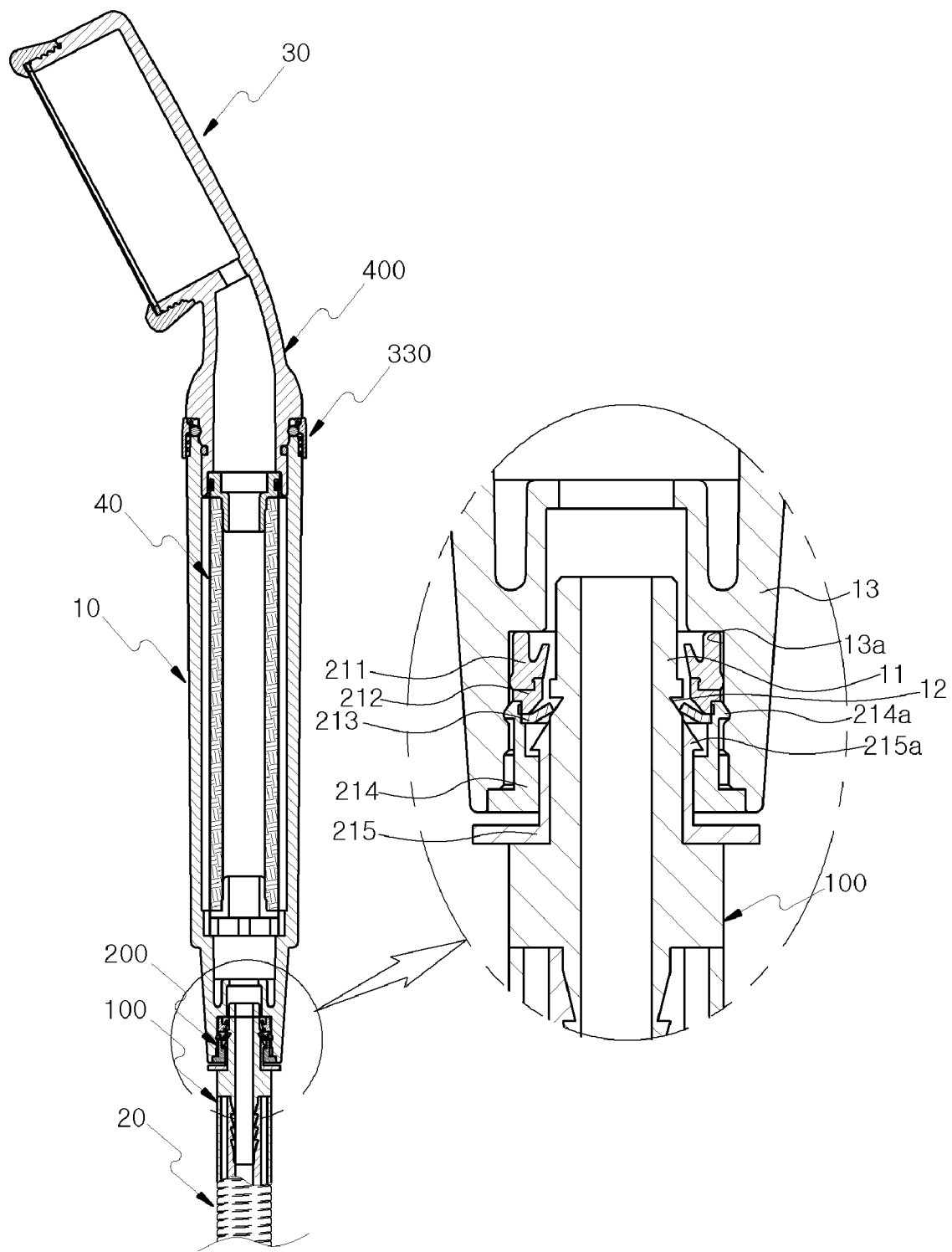
FIG. 9 is a sectional view illustrating a state after coupling of the handle body of the shower head and the hose.

With reference to the attached drawings, example embodiments of a shower head with a one-touch detachable structure according to the present invention will herein be described in detail.

The example embodiments of the present invention are capable of various modifications and alternative forms, and particular embodiments of the present invention will be illustrated in the attached drawings and described in this specification in detail. It should be understood, however, that there is no intent to limit example embodiments of the invention to the particular forms disclosed, but on the contrary, example embodiments of the invention are to cover all modifications, equivalents, and alternatives falling within the technical idea and scope of the present invention.

FIGS. 1 to 9 illustrates a shower head with a one-touch detachable structure according to a first preferred embodiment of the present invention.

The shower head 1 according to the first preferred embodiment of the present invention is installed in a bathroom or on a sink to be usable. The shower head 1 includes: a handle body 10, which has a body 11, a flow path 12 formed in the body 11 so that tap water can flow, and a lower end to which a hose 20 connected with a faucet 2 is connected so that a user can grasp it with the hand; and a head assembly 30 which is detachably combined with the upper end of the handle body 10 and has a water spray board 31 having fine water discharge holes 31a for spraying tap water introduced through the flow path 12.

Hereinafter, the configuration of the shower head according to the present invention will be described in detail.

The handle body 10 is made of a synthetic resin material or a metallic material. A user grasps the handle body with the hand in order to spray tap water using the shower head 1. The body 11 has a flow path 12 formed therein so that tap water moves to an outlet 14 of the upper end through the flow path 12 when tap water is introduced from an inflow connection part 13 of the lower end connected with the hose 20.

In this instance, the handle body 10 is formed in a cylindrical shape so that the user can grasp it easily, but may be formed in one among various shapes, such as a polygonal tube, in consideration of designs.

A cylindrical filter member 40 for filtering foreign matters of raw water introduced from the inflow connection part 13 of the lower end is mounted in the flow path 12 of the handle body 10 so as to prevent the fine water discharge holes 31a of the spray board 31 from being blocked by the foreign matters of the raw water.

The filter member 40 is manufactured with nonwoven fabric of 0.3 mm or less which is rolled cylindrically manyfold or is made up of well-known sediments. The filter member 40 includes: a cylindrical filter body 41 which has a passage 41a formed in the middle; a lower cap 42 which is coupled to the lower end of the filter body 41 to finish the lower end of the passage 41a and has a guide hole 42a formed in the bottom surface in order to guide the raw water introduced through the filter foreign matters of raw water introduced from the inflow connection part 13 of the handle body 10 to the outside of the filter body 41; and an upper cap 43 which is coupled to the upper end of the filter body 41 and has a discharge hole 43a formed at the center so that the purified raw water introduced into the passage 41a is discharged.

Of course, an O-ring 44 for preventing water leak is mounted on the outer peripheral surface of the upper cap 43 to get in contact with the inner peripheral surface of the outlet 14 of the handle body 10.

Moreover, the head assembly 30 includes: a head housing 32 having a space part to which tap water discharged through the handle body 10 is introduced, and a coupling part 421 disposed on the lower portion of the head housing to be coupled with the upper end of the handle body 10 and having inflow holes 421 through which tap water is introduced; the spray board 31 attached to the front of the head housing 32 and having the plurality of fine water discharge holes 31a for spraying tap water; and a front cover 33 coupled to the front end of the head housing 32 to fix the spray board 31 onto the head housing 32.

In the meantime, the inflow connection part 13 disposed at the lower end of the handle body 10 has an outer diameter which gets gradually narrower toward the lower end, so can be held on a holding recess 3a of a shower head holder 3 fixed on the wall surface on which the faucet 2 is installed.

The inflow connection part 13 can be formed integrally with the handle body 10, and has a coupling groove 13a. Preferably, the coupling groove 13a is formed on the lower end of the handle body 10 to be stepped.

Meanwhile, a first connection means 100 is disposed at an end portion of the hose 20, and a second connection means 200 is disposed on the inflow connection part 13 disposed at the lower end of the handle body 10 to be detachably connected with the first connection means 100.

In this instance, the first connection means 100 is mounted at the front end of the hose 20 and has a male coupler 110 having an insertion tube 111 protruding from the front end. The second connection means 200 is mounted on the inflow connection part 13 and has a female coupler 210 for locking or unlocking the insertion tube 111. The male coupler 110 of the hose 20 is coupled with the female coupler 210 of the inflow connection part 13 disposed at the lower end of the handle body 10 in one-touch so that the inner flow path can be connected or disconnected.

In this instance, the male coupler 110 is formed in a cylindrical shape, has an end connected to the hose 20 and the other end from which the insertion tube 111 fit into the female coupler 210 extends, and has a retaining groove 112 formed on the outer peripheral surface of the insertion tube 111.

Additionally, the female coupler 210 includes: a first sealing member 211 and a second sealing member 212 each of which one side is fit and seated onto the coupling groove 13a of the inflow connection part 13 disposed at the lower end of the handle body 10; a holder ring 213 having an elastic piece 213a caught to the retaining groove 112 formed on the outer peripheral surface of the insertion tube 111 of the male coupler 110; a cap ring 214 which presses the holder ring 213 in the direction of the second sealing member 212 to fix the holder ring 213 to the coupling groove 13a of the inflow connection part 13; and a push ring 215 which presses the elastic piece 213a of the holder ring 213 caught to the retaining groove 112 formed on the outer peripheral surface of the insertion tube 111 of the male coupler 110 to separate the elastic piece 213a from the retaining groove 112.

In this instance, the cap ring 214 has a protruding jaw 214a formed on the outer peripheral surface thereof. When the cap ring 214 is fit to the coupling groove 13a of the inflow connection part 13 after the first and second sealing members 211 and 212 and the holder ring 213 are inserted into the coupling groove 13a of the inflow connection part 13, the protruding jaw 214a is coupled to the retaining groove formed on the inner peripheral surface of the coupling groove 13a of the inflow connection part 13 to be fixed firmly, so that the first and second sealing members 211 and 212 and the holder ring 213 are firmly fixed to the coupling groove 13a of the inflow connection part 13 without separation.

In addition, the second sealing member 212 has a locking jaw 212a formed on the outer face thereof, and the cap ring 214 has a locking groove 214b formed on the upper portion of the inner wall thereof to support the locking jaw 212a of the second sealing member 212. Therefore, when the holder ring 213 is fit to the inner upper portion of the cap ring 214 to press the second sealing member 212 downwards, the locking jaw 212a of the second sealing member 212 is clicked and fixed to the locking groove 214b not to be separated. Therefore, the cap ring 214 to which the second sealing member 212 and the holder ring 213 are fixed can be assembled to the inflow connection part 13 easily.

Moreover, a fitting protrusion part 212b is formed at the upper end of the second sealing member 212, and a fitting groove 211a is formed at the lower portion of the first sealing member 211 so that the fitting protrusion part 212b of the second sealing member 212 is inserted into the fitting groove 211a. Therefore, when the first sealing member 211 is inserted into the second sealing member 212 and the second sealing member 212 is fixed to the cap ring 214 to which the holder ring 213 is fixed, an assembly is formed. Therefore, the assembly can be assembled to the inflow connection part 13 more conveniently. In this instance, the first sealing member 211 is made of a silicon or rubber material, and the second sealing member 212 is made of a synthetic resin material. However, the first and second sealing member 211 and 212 are not limited to the above, but may be made of one among various materials.

According to the structures of the male coupler 110 and the female coupler 210, the shower head 1 can be coupled with or separated from an end portion of the hose in one-touch. In detail, in order to couple the end portion of the hose 20 to the handle body 10 of the shower head 1, when an insertion tube 111 of the male coupler 110 coupled to the hose 20 passes through the push ring 215 and the cap ring 214 and is pressed more, the elastic piece 213a of the holder ring 213 is folded and is inserted into the retaining groove 112 and is restored, so that the insertion tube 111 of the male coupler 110 is not separated from the female coupler 210. After that, in order to separate the handle body 10 of the shower head 1 from the end portion of the hose 20, the user has to press the push ring 215. Then, an inclined pressing part 215a of an end portion of the push ring 215 presses the elastic piece 213a of the holder ring 213. After that, the elastic piece 213a is bent outwards and is separated from the retaining groove 112 of the male coupler 110. In this instance, the insertion tube 111 of the male coupler 110 coupled to the hose 20 is separated from the female coupler 210 of the handle body 10.

In the drawings, it is illustrated that the first connection means 100 is disposed at the end portion of the hose 20 and the second connection means 200 is disposed on the shower head 1, but it is also possible that the second connection means 200 is disposed at the end portion of the hose 20 and the first connection means 100 is disposed at the shower head 1, and such a simple change of location belongs to the scope of the present invention.

In addition, a third connection means 300 is disposed at the upper end of the handle body 10, and a fourth connection means 400 is disposed at the lower end of the head assembly 30, so that the third connection means 300 and the fourth connection means 400 are simply attached and detached in one-touch.

In this instance, the third connection means 300 is disposed at the upper end of the handle body 10, and includes: a fixing part 310 extending to the upper end of the handle body 10 and having a third path 311 vertically formed at the center thereof and a plurality of ball seating parts 312 formed on the flank; fixing balls 320 rotatably disposed on the plurality of ball seating parts 312; and a push member 330 coupled to the outer peripheral surface of the fixing part 310 to support the fixing balls 320 and being vertically movable along the fixing part 310 to make the fixing balls 320 appear and disappear in the direction of the third path 311.

In this instance, a support jaw 313 is formed on the outer peripheral surface of the fixing part 310, a spring seating groove 331 is formed on the inner surface of the push member 330, and a return spring 340 is mounted on the spring seating groove 331 to press the push member 330 upwards. A knurling part 332 which can prevent slip is disposed on the outer face of the push member 300 to protrude when the user pulls the knurling part 332 downwards.

Moreover, the fourth connection means 400 is disposed at the lower end of the coupling part 421 of the head assembly 30, and includes a connection member 410, which has a connection part 411 protruding downwards to be inserted into the third path 311 of the fixing part 310 and having a fourth path 411a formed in the longitudinal direction and a ball support groove 412 formed on the outer peripheral surface of the connection part 411 to support the fixing balls 320 on the same circumference. In this instance, the ball support groove 412 may be formed concavely on the outer peripheral surface of the connection part 411, but may be formed dividedly by a support protrusion protruding outwards on the same circumference. In this instance, the fixing balls 320 run over the support protrusion and move to the ball support groove 412 if there is no interference of the push member 330.

Furthermore, a ring groove 318 is formed at the upper end of the fixing part 310 and a leakage prevention ring 319 is mounted on the ring groove 318. When the connection part 411 of the connection member 410 is inserted into the third path 311 of the fixing part 310, the upper end of the inside of the push member 330 gets in contact with the leakage prevention ring 319 so as to prevent leakage of water.

According to the above structure, when the user pulls down the push member 330 with the hand in order to connect the third connection means 300 with the fourth connection means 400, a physical force applied to the fixing balls 320 by the push member 330 is released, and in this state, the connection part 411 of the connection member 410 can be easily inserted into the third path 311 of the fixing part 310.

After that, when the user releases the push member 330, the push member 330 returns upwards by restoring force of the return spring 340, and pushes the fixing balls 320 located on the ball seating parts 312 in the direction of the third path 311 of the fixing part 310. Therefore, some of the fixing balls 320 is continuously supported on the ball support groove 412 formed on the outer peripheral surface of the connection part 411 of the connection member 410, so that the third connection means 300 and the fourth connection means 400 are not separated from each other.

Of course, in order to separate the third connection means 300 and the fourth connection means 400 from each other, when the user holds and pulls the push member 330, the push member 330 lowers and the physical force applied to the fixing balls 320 is released. Therefore, the connection part 411 of the connection member 410 can be easily separated from the third path 311 of the fixing part 310.

Furthermore, rotation preventing grooves 310a are formed at the upper end of the fixing part 310 of the handle body 10, and rotation preventing protrusions 421a supported in the rotation preventing grooves 310a are formed on the coupling part 421 of the head assembly 30. In this instance, at least one pair of the rotation preventing groove 310a and the rotation preventing protrusion 421a are disposed. Therefore, when the third connection means 300 and the fourth connection means 400 are coupled with each other, the rotation preventing protrusion 421a is supported to the rotation preventing groove 310a so as to prevent the head assembly 30 from being rotated from the handle body 10 arbitrarily.

Due to the above structure, the handle body 10 and the head assembly 30 can be connected to or separated from each other just by a simple action that the user pulls or pushes the head assembly 30 while pressing the push member 330 disposed at the upper end of the handle body 10. When the user releases the push member 330 in the state where the handle body 10 and the head assembly 30 are connected with each other, because the push member 330 is returned automatically by the return spring 340 so that the head assembly 30 is not separated from the handle body 10, the user can use the shower head stably.

Additionally, because the user can pull or push the head assembly 30 from or into the handle body 10 just with less power in the state where the push member 330 is pulled downwards, women or the old and the infirm can easily wash or replace the filter member.

Moreover, an O-ring 413 which is closely supported on the inner surface of the third path 311 is mounted on the outer peripheral surface of the lower side of the connection part 411 of the fourth connection means 400 in order to prevent water leak at the connected portion when the third and fourth connection means 300 and 400 are connected with each other.

In the above, it is described that the third connection means 300 is disposed at the upper end of the handle body 10 and the fourth connection means 400 is disposed at the lower end of the coupling part 421 of the head assembly 30, but the fourth connection means 400 may be disposed at the upper end of the handle body 10 and the third connection means 300 may be disposed at the lower end of the coupling part 421 of the head assembly 30. Such a change in design belongs to the scope of the present invention.

Figure 10:
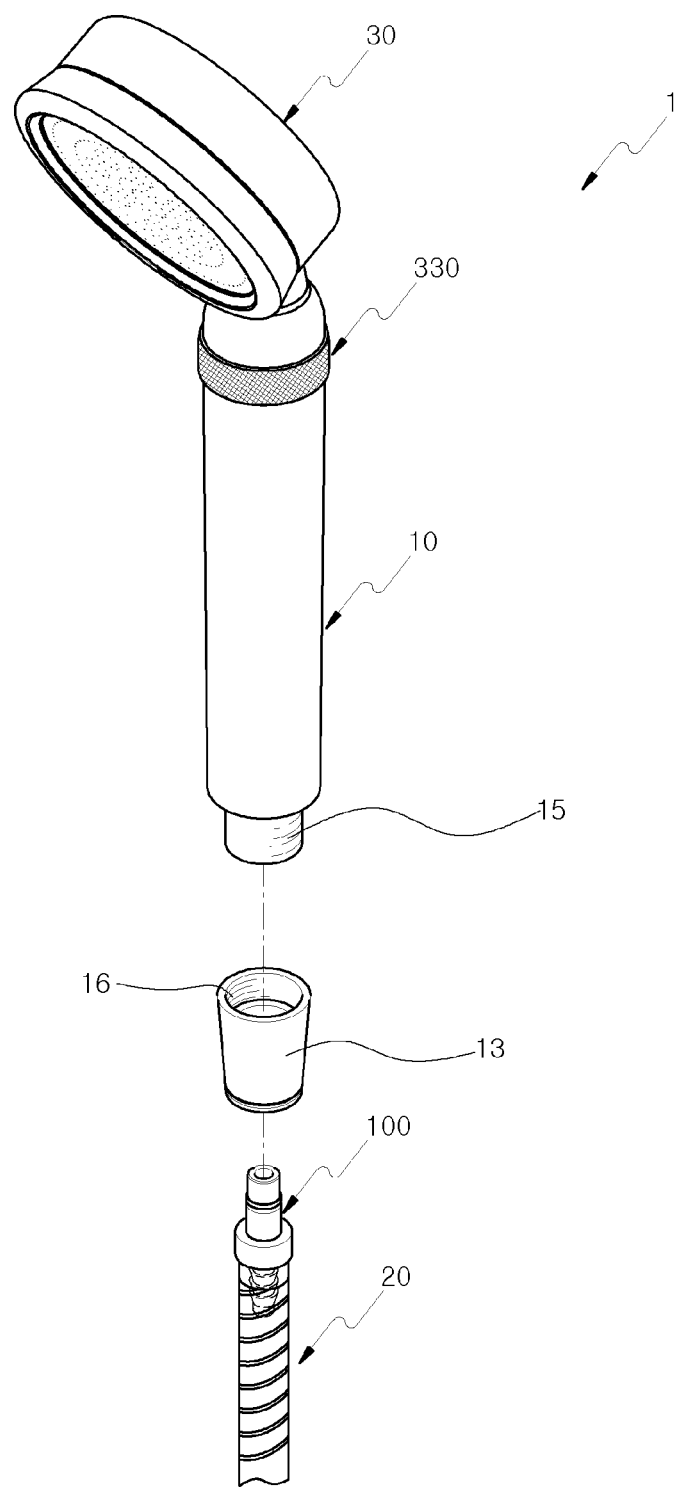
FIG. 10 is a perspective view illustrating an exploded state of a handle body of the shower head and a hose according to a second preferred embodiment of the present invention.
Figure 11:
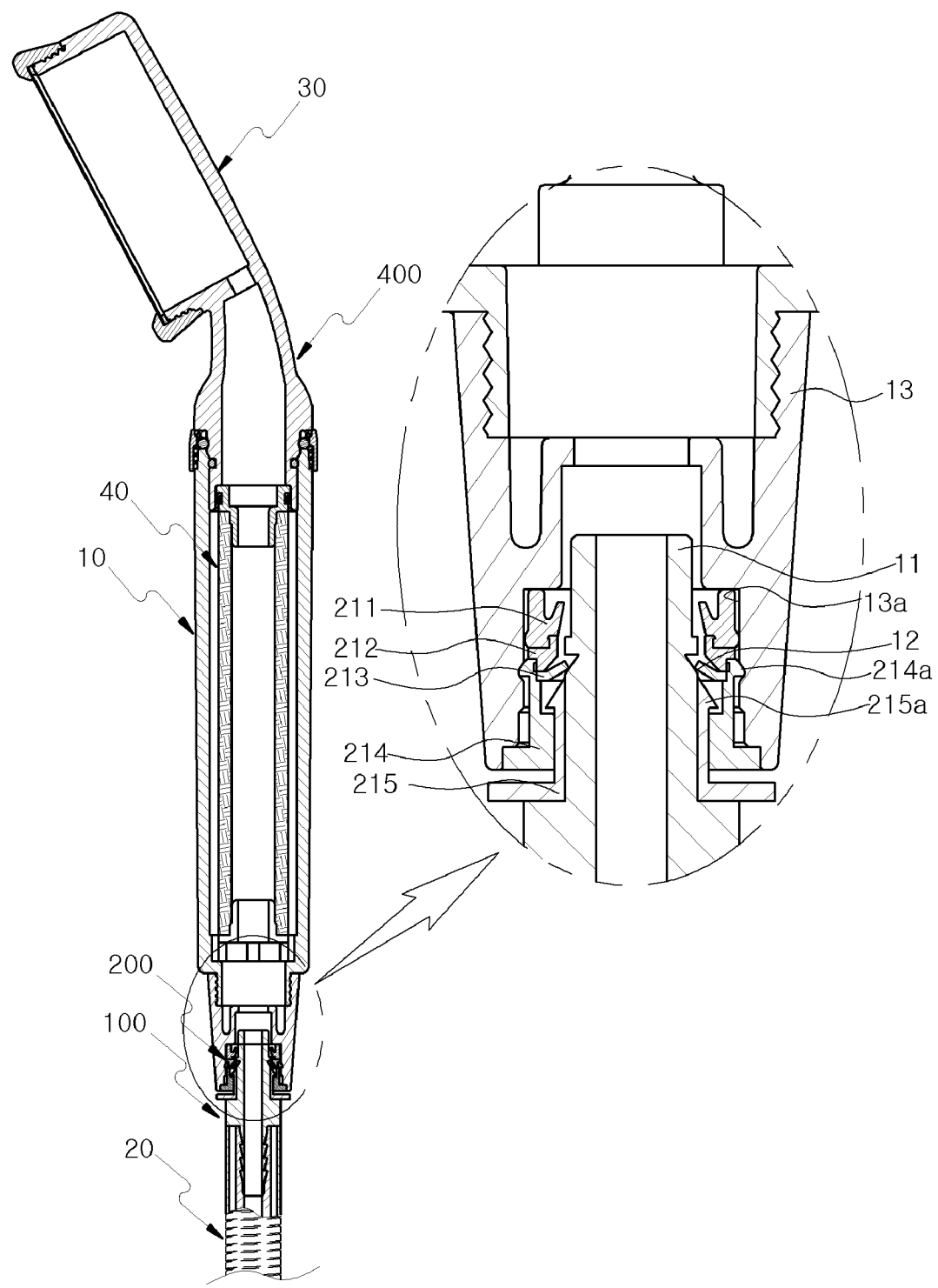
FIG. 11 is a sectional view illustrating a state where the handle body of the shower head is coupled with the hose according to the second preferred embodiment of the present invention.

Meanwhile, FIGS. 10 and 11 are views for explaining a shower head with a one-touch detachable structure according to a second preferred embodiment of the present invention.

In the drawings, the inflow connection part 13 disposed at the lower end of the handle body 10 is screw-coupled. Because the handle body 10 and the inflow connection part 13 can be separated from each other and connected to each other, a male screw thread 15 is extended at the lower end of the handle body 10, and the inflow connection part 13 is perforated in the longitudinal direction so that tap water can movable therein. Moreover, the inflow connection part 13 has a female screw thread 16 formed on the upper side of the inner peripheral surface, so that the inflow connection part 13 is screw-coupled to the lower end of the handle body 10.

Figure 12:
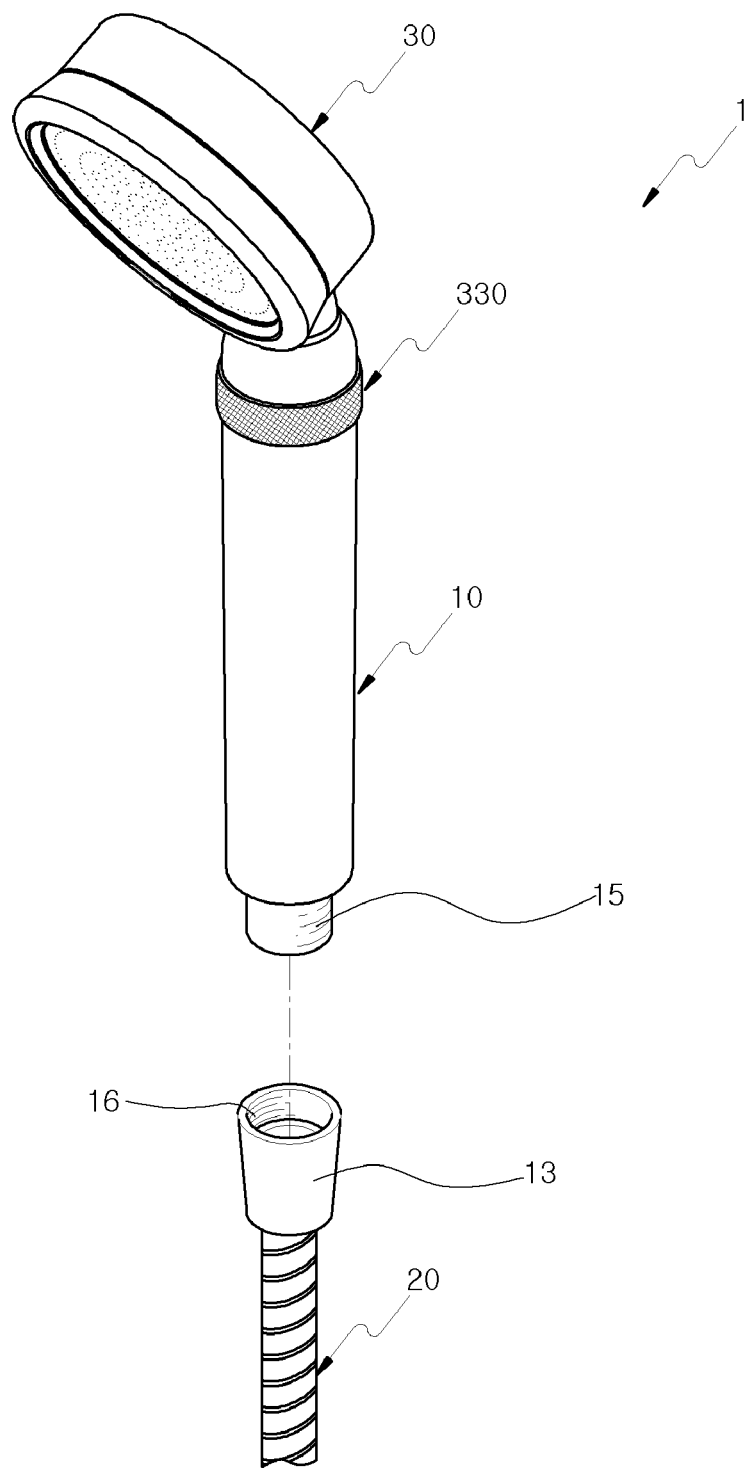
FIG. 12 is a sectional view illustrating a coupled state of a shower head according to a third preferred embodiment of the present invention.

FIG. 12 is a sectional view illustrating a coupled state of a shower head according to a third preferred embodiment of the present invention. Referring to FIG. 12, the handle body 10 of the shower head, and the third connection means 300 and the fourth connection means 400 of the head assembly 30 are coupled to each other or separated from each other in one-touch. The male screw thread 15 is disposed at the lower end of the handle body 10, the inflow connection part 13 is coupled to the end portion of the hose 20, and the female screw thread 16 is disposed at the inflow connection part 13, so that the handle body 10 and the hose 20 are connected with each other through screw-coupling.

The inflow connection part 13 of the handle body 10 and the hose 20 keeps the firmly connected state, and only the head assembly 30 can be easily separated from the handle body 10 of the shower head. Of course, the cylindrical filter member 40 can be easily separated from the upper end of the handle body 10.

Figure 13:
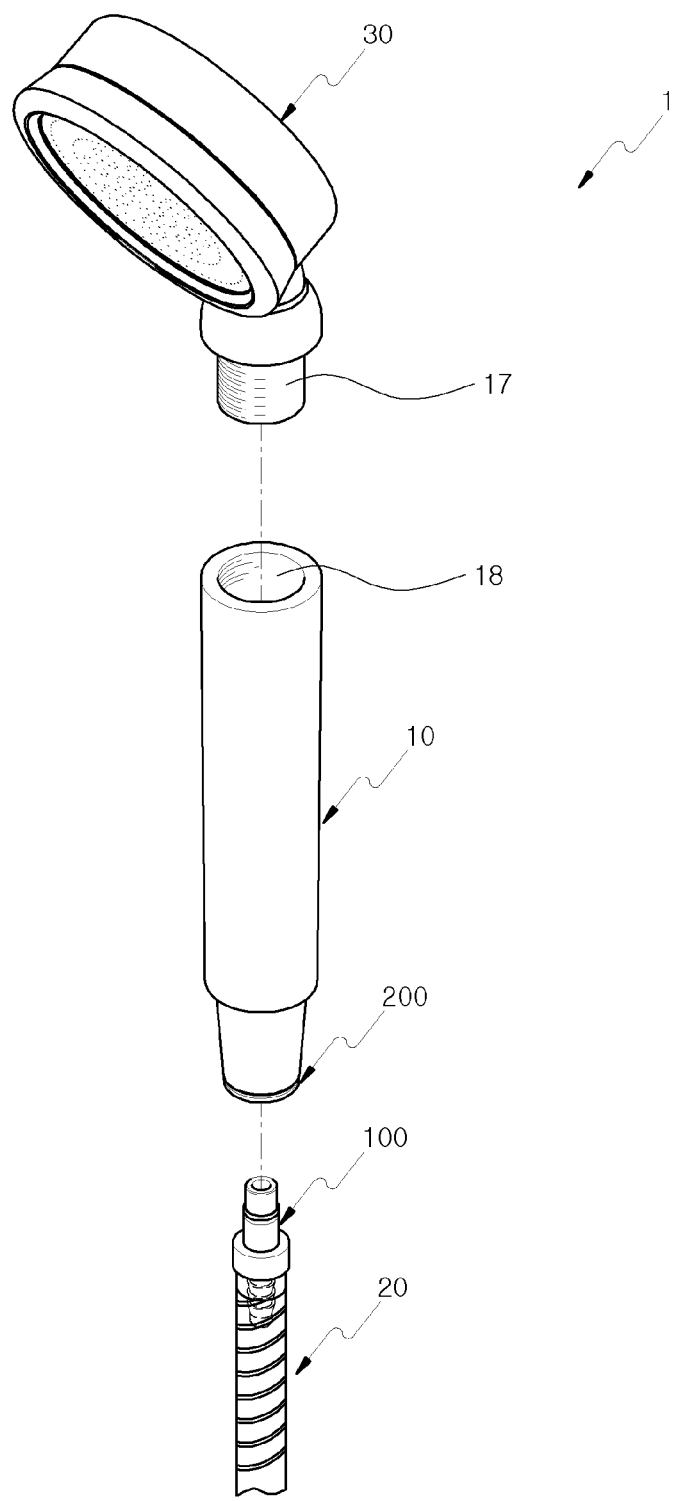
FIG. 13 is a sectional view illustrating a coupled state of a shower head according to a fourth preferred embodiment of the present invention.

Additionally, FIG. 13 is a sectional view illustrating a coupled state of a shower head according to a fourth preferred embodiment of the present invention. Referring to FIG. 13, the handle body 10 of the shower head, and the first connection means 100 and the second connection means 200 of the hose 20 can be connected to each other and separated from each other in one-touch. A male screw thread 17 is disposed at the lower end of the head assembly 30 and a female screw thread 18 is disposed at the upper end of the handle body 10, so that the head assembly 30 and the handle body 10 can be screw-coupled with each other.

Therefore, the head assembly 30 and the handle body 10 can maintain the firmly connected state and the shower head can be easily separated from the hose 20.

As described above, while the present invention has been particularly shown and described with reference to the example embodiments thereof, it will be understood by those of ordinary skill in the art that the technical scope of the present invention is not limited by the above and all technical ideas within the equivalent scope belong to the technical scope of the present invention.

The invention claimed is:

1. A shower head with a one-touch detachable structure, which includes a handle body which has a flow path formed therein so that tap water can flow therein and of which a lower end is connected to a hose, and a head assembly which is coupled to an upper end of the handle body and to which a water spray board having water discharge holes for spraying tap water introduced through the flow path is coupled, the shower head comprising:
an inflow connection part disposed at the lower end of the handle body;
a first connection means disposed at an end portion of the hose; and
a second connection means disposed at the inflow connection part in order to be detachably attached to the first connection means,
wherein the first connection means includes: a male coupler mounted at a front end of the hose and having an insertion tube protruding from a front end of the male coupler, and the second connection means includes a female coupler mounted at the inflow connection part in order to lock or unlock the insertion tube,
wherein the male coupler is formed in a cylindrical shape, has an end connected to the hose and another end from which the insertion tube fits into the female coupler, and has a retaining groove formed on an outer peripheral surface of the insertion tube,
wherein the female coupler includes: a first sealing member and a second sealing member, a side of each of which is fit and seated onto a coupling groove of the inflow connection part disposed at the lower end of the handle body; a holder ring having an elastic piece coupled to the retaining groove formed on the outer peripheral surface of the insertion tube of the male coupler; a cap ring which presses the holder ring in the direction of the second sealing member to fix the holder ring to the coupling groove of the inflow connection part; and a push ring which presses the elastic piece of the holder ring coupled to the retaining groove formed on the outer peripheral surface of the insertion tube of the male coupler to separate the elastic piece from the retaining groove,
wherein the second sealing member has a locking jaw formed on an outer face thereof, and the cap ring has a locking groove formed on an upper portion of an inner wall thereof to support the locking jaw of the second sealing member, and
wherein a fitting protrusion part is formed at an upper end of the second sealing member, and a fitting groove is formed at a lower portion of the first sealing member so that the fitting protrusion part of the second sealing member is inserted into the fitting groove.

2. The shower head according to claim 1, wherein the inflow connection part extends integrally and an outer diameter thereof decreases toward a lower end thereof.

3. The shower head according to claim 1, wherein a male screw thread is extended at the lower end of the handle body, and a female screw thread is formed at an upper side of an inner peripheral surface of the inflow connection part to be screw-coupled with the male screw thread.

4. A shower head with a one-touch detachable structure, which includes a handle body which has a flow path formed therein so that tap water can flow therein and of which a lower end is connected to a hose, and a head assembly which is coupled to an upper end of the handle body and to which a water spray board having water discharge holes for spraying tap water introduced through the flow path is coupled, the shower head comprising:
an inflow connection part disposed at a lower end of the handle body;
a first connection means disposed at an end portion of the hose; and
a second connection means disposed at the inflow connection part in order to be detachably attached to the first connection means,
wherein a third connection means is disposed at the upper end of the handle body, and a fourth connection means is disposed at a lower end of the head assembly, so that the third connection means and the fourth connection means are attachable or detachable in one-touch,
wherein the third connection means includes: a fixing part extending to the upper end of the handle body and having a third path vertically formed at a center thereof and a plurality of ball seating parts formed on a flank; fixing balls rotatably disposed on the plurality of ball seating parts; and a push member coupled to an outer peripheral surface of the fixing part to support the fixing balls and being vertically movable along the fixing part to make the fixing balls appear or disappear in a direction of the third path, and
wherein the fourth connection means is disposed at a lower end of a coupling part of the head assembly, and includes a connection member having a connection part which protrudes downwards to be inserted into the third path of the fixing part and has a fourth path formed in a longitudinal direction, and a ball support groove which is formed on an outer peripheral surface of the connection part to support the fixing balls on a same circumference.

5. The shower head according to claim 4, wherein a support jaw is formed on the outer peripheral surface of the fixing part, a spring seating groove is formed on an inner surface of the push member, and a return spring is mounted on the spring seating groove to press the push member upwards.

6. The shower head according to claim 4, wherein rotation preventing grooves are formed at an upper end of the fixing part of the handle body, and rotation preventing protrusions supported in the rotation preventing grooves are formed on the coupling part of the head assembly.

* * * * *